May 5, 1925.

E. A. BROWN

AUTOMOBILE BRAKE LINING

Filed Oct. 6, 1921

1,536,071

INVENTOR.
ELMER A. BROWN
BY
ATTORNEY.

Patented May 5, 1925.

1,536,071

UNITED STATES PATENT OFFICE.

ELMER A. BROWN, OF DENVER, COLORADO.

AUTOMOBILE BRAKE LINING.

Application filed October 6, 1921. Serial No. 505,885.

*To all whom it may concern:*

Be it known that I, ELMER A. BROWN, a citizen of the United States, and a resident of Denver, in the county of Denver and State of Colorado, have invented certain new and useful Improvements in Automobile Brake Linings, of which I do declare the following to be a full, clear, and exact description of the same, such as will enable others skilled in the art to which it appertains to make and use my invention, reference being had to the accompanying drawings, and to the reference numerals marked thereon, which form a part of this specification.

The invention relates to linings for brake bands and shoes, particularly of the type adapted for use in automobiles, and has for its principal object the provision of a brake lining which will resist wear and form a yielding, resilient body which will gradually yet firmly grasp the brake drum without binding or chattering.

Another object of the invention is to provide a brake lining which will not score or scratch the surface of the brake drum.

A further object of the invention is to provide a brake lining which will not disintegrate and leave strings or pieces thereof in the oil of the engine when used on interior brakes as do the common cloth, cork insert and asbestos linings at present in use.

A still further object is to provide a brake lining which will act as spring, its inherent elasticity tending to always expand the brake band and causing said band to expand instantly and uniformly when it is intended to release the brake.

With these and other objects in view the invention will now be described in detail, reference being had to the accompanying drawing which forms a part of this specification.

On the drawing.

Corresponding and like parts are referred to in the following specifications and indicated in all views of the accompanying drawing by the same reference characters.

Figure 1:
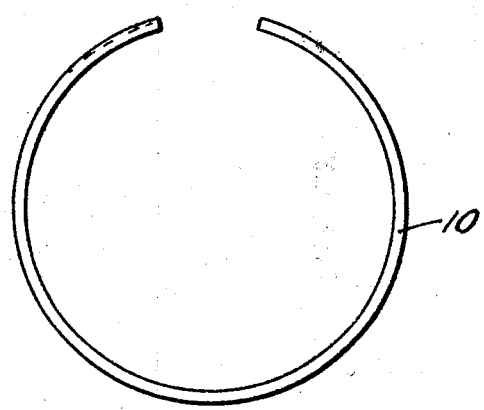
Figure 1 is a side elevation of one of the improved brake linings.

Let the numeral 10 designate my improved brake lining which is formed of wood, preferably, bass wood or hickory. Lining 10 is formed as follows:

The wood is cut in a strip, lengthwise of the grain thereof, of the proper width and thickness to fit the desired brake band. This strip is now softened by steaming or any other desirable method, and bent in a mold to the diameter desired and allowed to dry or harden when it will retain the shape as shown in Fig. 1. The diameter of lining thus obtained is slightly larger than the diameter of the brake drum upon which it is to be used so that it will constantly tend to force the brake band away from the drum. This action causes the brake to always expand and contract equally in all directions, thus causing it to exert a uniform pressure on the drum at all points, thereby preventing any gripping or chattering action.

Figure 2:
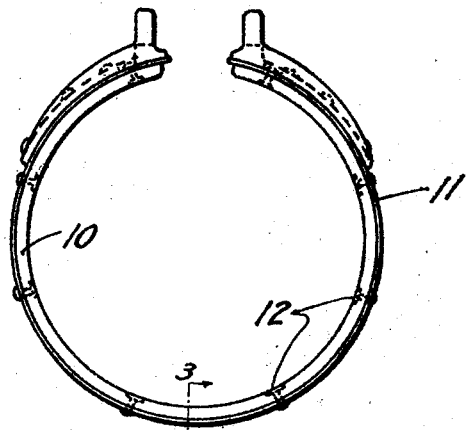
Figure 2 is a side elevation of a brake band, with the improved brake lining in place thereon.
Figure 3:
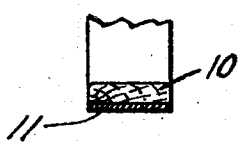
Figure 3 is a cross section taken through the brake band and lining on the line 3—3, Fig. 2.

In installing, lining 10 is placed within a brake band 11 and drilled for the ordinary copper rivets 12 by which it is held to the band. The whole presenting the appearance shown in Fig. 2.

The lining has been found to operate more satisfactory if soaked to saturation in lubricating oil before use.

The invention has been subjected to several months tests in comparison with all standard makes of brake linings upon the brake bands of a certain popular make of automobiles and was found to give an average of 500% more service than could be obtained from any of the bands at present in use.

The wood wears down very slowly and leaves no residue in the oil that will clog the oil passages of the motor.

It was also found that the copper rivets wear simultaneously with the lining and are never left projecting above the surface to score the surface of the brake drum.

While a specific form of the improvement has been described and illustrated herein, it is desired and understood that the same may be varied, within the scope of the appended claims, without departing from the spirit of the invention.

Having thus described the invention, what I claim and desire to secure by Letters Patent is:—

1. The process of manufacturing a wooden lining for brake and transmission bands comprising; cutting the wood in strips lengthwise of the grain, said strips being equal in width to the brake or transmission band upon which the lining is to be used; softening the strips by steaming; bending the strips in an open circle on a mold of slightly larger diameter than the drum upon which the band is to be used; drying the strips in said mold and soaking the strips in a lubricating oil.

2. The step in the process of manufacturing a wooden lining for brake and transmission band comprising, soaking the lining in lubricating oil.

In testimony whereof, I affix my signature.

ELMER A. BROWN.